United States Patent [15] 3,680,929
Hnilicka et al. [45] Aug. 1, 1972

[54] MID-PITCH DRIVE LUG FOR TRACK LINK OF ENDLESS TRACK

[72] Inventors: Eugene J. Hnilicka, Aurora; George W. Cackley, Hanna City, both of Ill.

[73] Assignee: Caterpillar Tractor Co., Peoria, Ill.

[22] Filed: Sept. 2, 1970

[21] Appl. No.: 69,011

[52] U.S. Cl. ................................................. 305/57
[51] Int. Cl. ............................................ B62d 55/20
[58] Field of Search ................. 305/38, 37, 57, 59, 54

[56] References Cited

UNITED STATES PATENTS

| | | | |
|---|---|---|---|
| 3,567,294 | 3/1971 | Simpson | 305/57 |
| 3,563,614 | 2/1971 | Parks | 305/57 |
| 2,796,303 | 6/1957 | Atkinson | 305/37 |
| 1,513,459 | 10/1924 | Jett | 305/57 X |
| 1,446,292 | 2/1923 | George | 305/57 |
| 1,186,785 | 6/1916 | Holt | 305/57 |
| 2,598,828 | 6/1952 | Phelps | 305/57 |

Primary Examiner—Richard J. Johnson
Attorney—Fryer, Tjensvold, Feix, Phillips & Lempio

[57] ABSTRACT

An endless hinged joint track assembly for use with a vehicle having a notched drive sprocket is provided with link elements having a mid-pitch drive lug located midway between the hinged joints so that only the drive lugs contact the drive sprocket during operation of the vehicle. The mid-pitch drive lug is provided with a drive surface having a specific geometrical configuration to provide proper contact with the drive sprocket.

3 Claims, 4 Drawing Figures

PATENTED AUG 1 1972

INVENTORS
EUGENE J. HNILICKA
GEORGE W. CACKLEY

BY Fryer, Tjensvold, Feix, Phillips & Lempio

ATTORNEYS

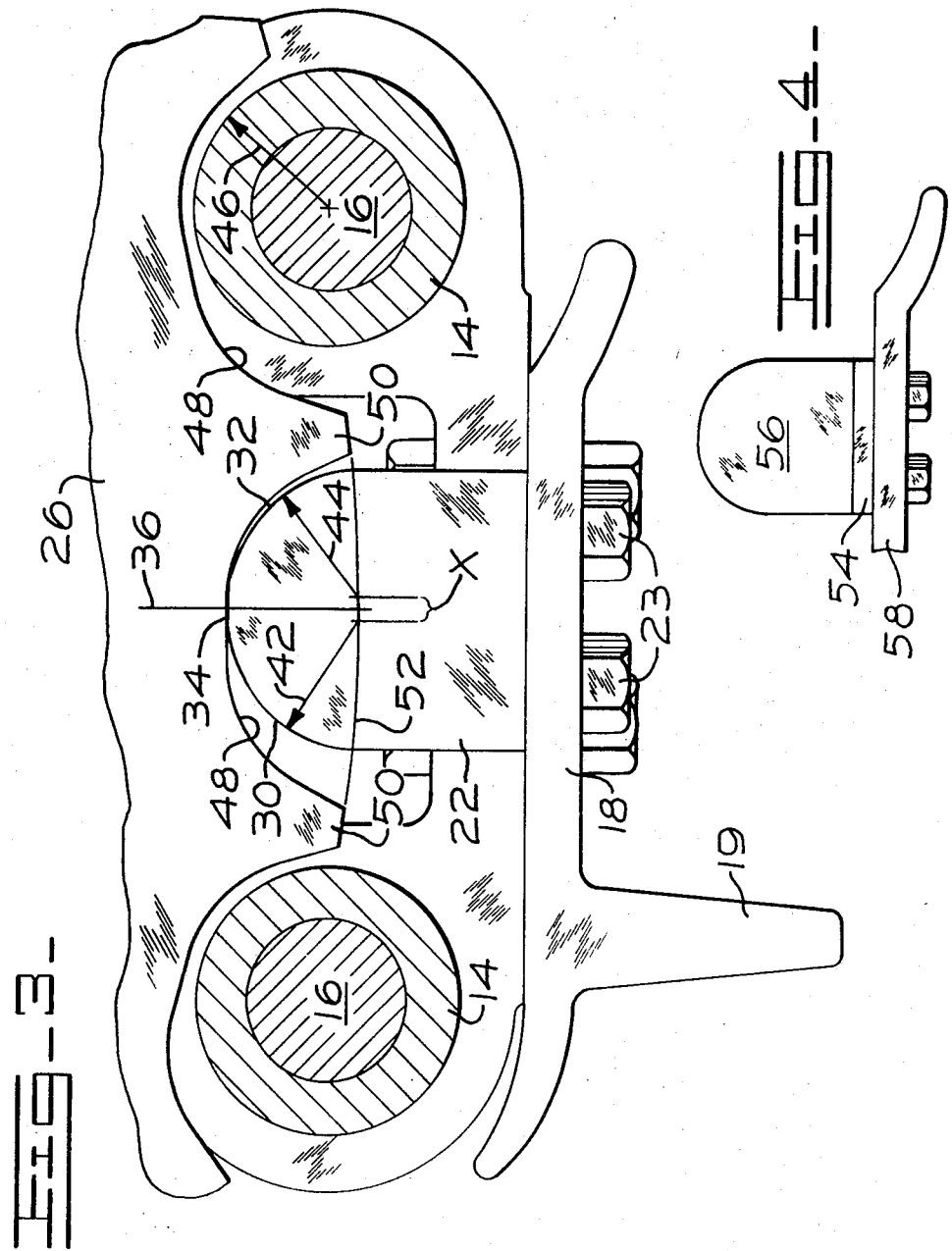

MID-PITCH DRIVE LUG FOR TRACK LINK OF ENDLESS TRACK

BACKGROUND OF THE INVENTION

This invention relates to an improved articulated drive chain assembly for a track-type vehicle, such as a crawler tractor. More particularly the invention relates to an improved drive lug for the endless track of a crawler tractor wherein the drive lug is releasably secured to a track shoe intermediate the pivot connections between each of the links.

The invention is specifically directed to an improved drive lug for such an endless track wherein the drive lug is located intermediate the link pivot connections, referred to as mid-pitch, and wherein the lug is constructed to certain design parameters whereby it may be easily installed on existing endless track constructions and will provide proper contact with notched portions of a conventional chain driving sprocket.

Conventional endless tracks used on track-type vehicles comprise a series of track links interconnected by pins which are fitted with an external bushing. In such a construction the track links have an upper rail portion upon which the track wheels roll. The pin and bushing connections of these conventional prior art structures provide a drive means for co-action with a chain driving sprocket whereby the chain is forcefully driven by rotational movement of the sprocket.

Although such a track construction has gained wide acceptance it is subject to several shortcomings such as cracking of the bushings due to the high impact load imposed on them by the drive sprocket. Such conventional structures are also subjected to a high rate of wear on the bushing and frictional power losses due to scrubbing action of the bushings against the sprocket, especially in reverse drive. An additional drawback of such conventional prior art structures is the excessive noise generated by the track and certain power losses which result from the kinematic relationship between the driving sprocket and such a conventional track link construction.

A recent development of the art of endless tracks for track-type vehicles resides in the provision of a drive lug located on the track shoes intermediate the pin and bushing connections, which drive lug forms the contact element between the track and the drive sprocket. With such a construction the relative velocity at which the drive lug impacts the drive sprocket is very substantially reduced thus reducing wear, power losses, scrubbing and noise.

The present invention relates to a new and improved construction for such a mid-pitch drive lug wherein certain geometric design parameters are utilized to maximize the effectiveness of the mid-pitch drive lug.

Other and further objects and advantages of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIG. 3 is a side elevation illustrating in detail the geometrical configuration and design parameters of the improved mid-pitch drive lug of the present invention; and FIG. 4 illustrates a modified embodiment of the invention.

DESCRIPTION OF THE PREFERRED EMBODIMENT

Figure 1:
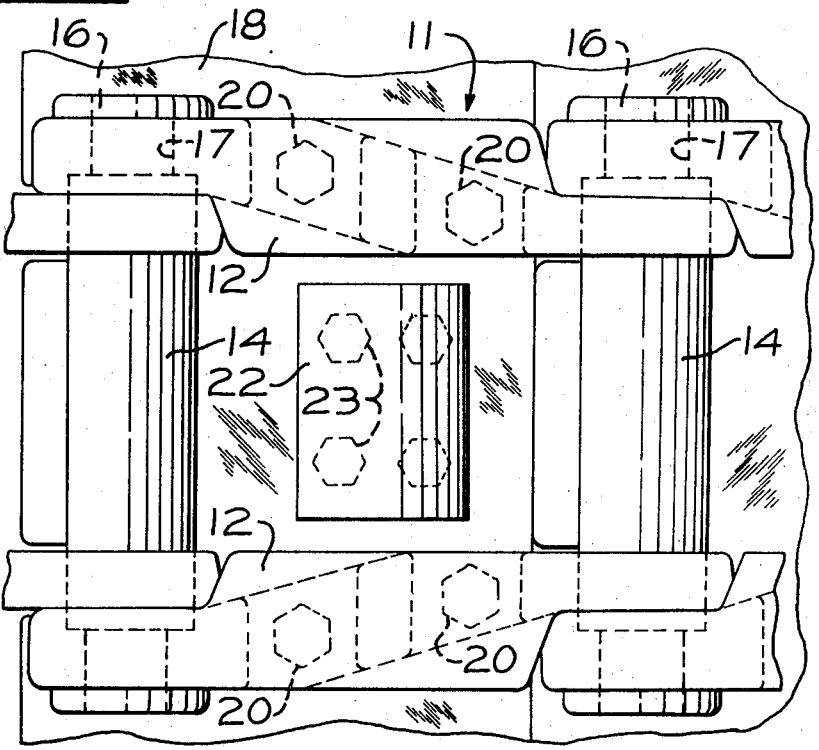
FIG. 1 is a plan view illustrating a preferred embodiment of the invention.
Figure 2:
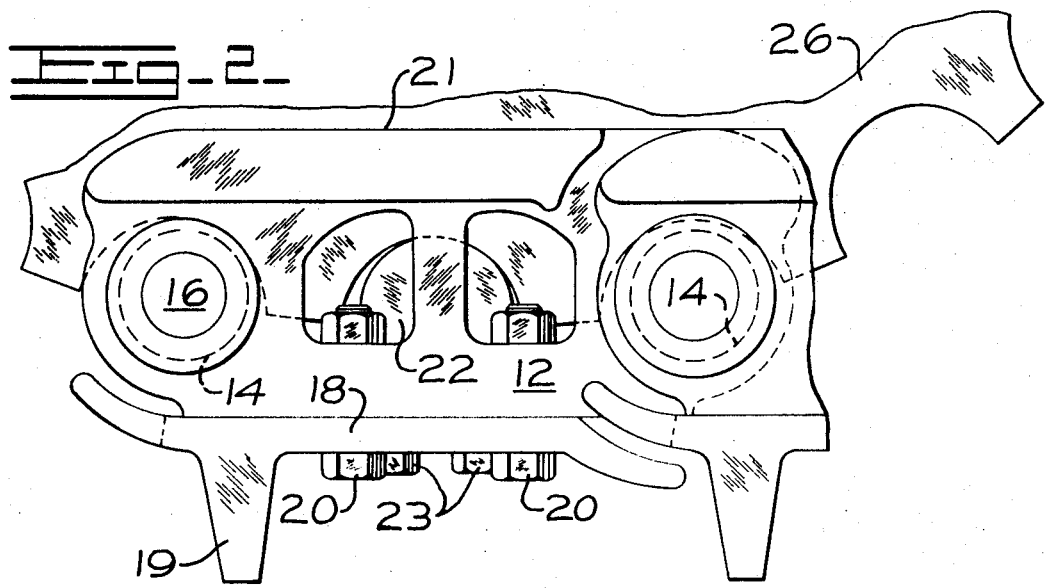
FIG. 2 is a side elevation of the embodiment illustrated in FIG. 1.

In FIGS. 1 and 2 there is shown one preferred embodiment of an improved articulated endless chain assembly employing a mid-pitch drive lug constructed in accordance with the present invention. The track link section generally shown at 11 is somewhat conventional and comprises a pair of links 12 which are retained in spaced relationship by a pair of track bushings 14 fitted about the outer diameter of a pair of track pins 16, which are received in bores 17 of the track links 12.

As best shown in FIG. 2, a track shoe 18, provided with the usual grouser 19, extends across the bottom of the links 12 and is secured to each of the links by a plurality of bolts 20. As also shown in FIG. 2 the track links are provided with upper rail surfaces 21 upon which the track wheels (not shown) roll.

The mid-pitch drive lug is shown at 22 and is disposed at a central point midway between the track bushings 14. In the embodiment of FIGS. 1 and 2, the mid-pitch drive lug 22 is rigidly secured to the track shoe 18 by a plurality of bolts shown at 23. FIG. 2 also illustrates a portion of a driving sprocket 26 and the manner in which the mid-pitch lug coacts with the sprocket 26 which will be more fully explained hereinafter.

In conventional present day track link constructions the notches between the teeth of the driving sprocket 26 engage the bushings 14 to thereby drive the endless track. As previously mentioned such a driving arrangement has definite disadvantages such as high impact of the bushings with the sprocket notches and excessive wear especially in reverse operation due to scrubbing action between the sprocket and the bushings. Obviously in such prior art constructions it was necessary to frequently replace the bushings 14 to extend the life of the endless track. In order to replace the bushings 14 it is necessary to remove the track from the vehicle and completely disassemble the track. This of course is a costly and time consuming operation.

The specific geometry and design parameters of the new and improved mid-pitch drive lug of the present invention are illustrated in FIG. 3. In FIG. 3 it will be noted that each drive lug 22 has a generally arcuate drive surface comprising front and rear contact surfaces 30,32 interconnected by a top contact surface 34. The front and rear surfaces 30,32 have equal radius convex curvatures. However, the centers of these arcuate surfaces are at opposite longitudinal sides of a central transverse vertical plane 36 through the lug. The top surface 34 of the lug 22 is formed by a plane which connects the surfaces 30 and 32 and is tangent to both of them.

It is preferable that the double radii 42,44 for the front and rear surfaces 30,32 be equal to the bushing radius 46. It should be noted that because the radii 42,44 are spaced from each other by a distance X the overall contact surface of the lug 22 comprising arcuate surfaces 30,32 and the planar surface 34 provides greater contact area with the sprocket notch surface 48 than did the bushing 14 employed in prior art constructions. Another preferred design parameter for the lug construction of FIG. 3 resides in locating the centers of the double radii 42,44 on the circle 52 which is the pitch radius of the sprocket teeth 50.

Since the lug 22 is located midway between the bushings 14, the impact velocity between the sprocket 26 and lug 22 will be substantially reduced. This reduces wear and breakage of the sprocket and drive lug and also substantially reduces power losses and noise created by operation of the vehicle. It should also be noted from FIG. 3 that the bushings 14 are not in driving contact with the sprocket notches 48 even though the lug height is lower than that of the bushings when measured upward from the track shoe 18. This substantially eliminates external wear at the bushings and consequently the "life" of these pivoted connections is now more or less dependent upon the life of the internal seals at these articulated joints. Even if the drive lug 22 becomes damaged or wears out, the lug may be easily and conveniently replaced by merely removing the bolts 23 rather than disassembling the entire track.

FIG. 4 illustrates a modified embodiment of the invention wherein a spacer element 54 is provided between the drive lug 56 and the track shoe 58. The spacer element 54 is used after the lug 56 has become worn down in order to extend the life of the lug. The spacer element 54 may be of any desired thickness and may be constructed of a less expensive material than the lug 56.

Although the invention has been hereinbefore described and illustrated in the accompanying drawings with respect to a preferred embodiment, various modifications and changes may be made therein without departing from the true spirit and scope of the invention, and thus it is not intended to limit the invention except by the terms of the appended claims.

What is claimed is:

1. In an endless track assembly of the type used on a vehicle provided with a drive sprocket having uniform teeth and notches alternately disposed about the circumference of the sprocket, said track assembly comprising, a pair of laterally spaced upstanding link elements; parallel pin and cylindrical bushing elements secured to and interconnecting opposite ends, respectively, of the links; a track shoe releasably secured to the bottoms of said links; the improvement comprising: a drive lug releasably secured to the shoe midway between the pin and bushing elements; said drive lug having a generally arcuate drive surface for contacting the notched portions of the drive sprocket; said drive surface of the lug having a height lower than the height of said bushings when measured upwardly from the shoe; said arcuate drive surface comprising front and rear convexly curved surfaces formed by equal length radii which radii are equal in length to the radius of the bushing elements and emanate from a pair of center points located within the lug which are outward on each respective side of a central transverse plane through the lug, said center points defining a linear distance therebetween; whereby the combined lengths of the two equal length radii and said linear distance are greater than the diameter of the bushing said drive surface further including a top contact surface comprising a plane which is tangent to and interconnects the front and rear surfaces, the linear distance on said plane between the points of tangency being equal to the distance defined between the center points; whereby the bushing elements do not engage the notched portions of the drive sprocket during operation of the vehicle.

2. The invention of claim 1 wherein the respective center points of the radii forming the front and rear curved surfaces are located on a circle defined by the pitch radius of the sprocket teeth.

3. The invention of claim 1 wherein a wear compensating spacer element is provided between the track shoe and the bottom of the lug to extend the life of the lug after wear has occurred at the drive surface thereof.

* * * * *